Aug. 18, 1953 C. S. McCHESNEY 2,649,287
APPARATUS FOR CONTINUOUS FROTHING OF RUBBER LATEX
Filed Oct. 11, 1951 4 Sheets-Sheet 3

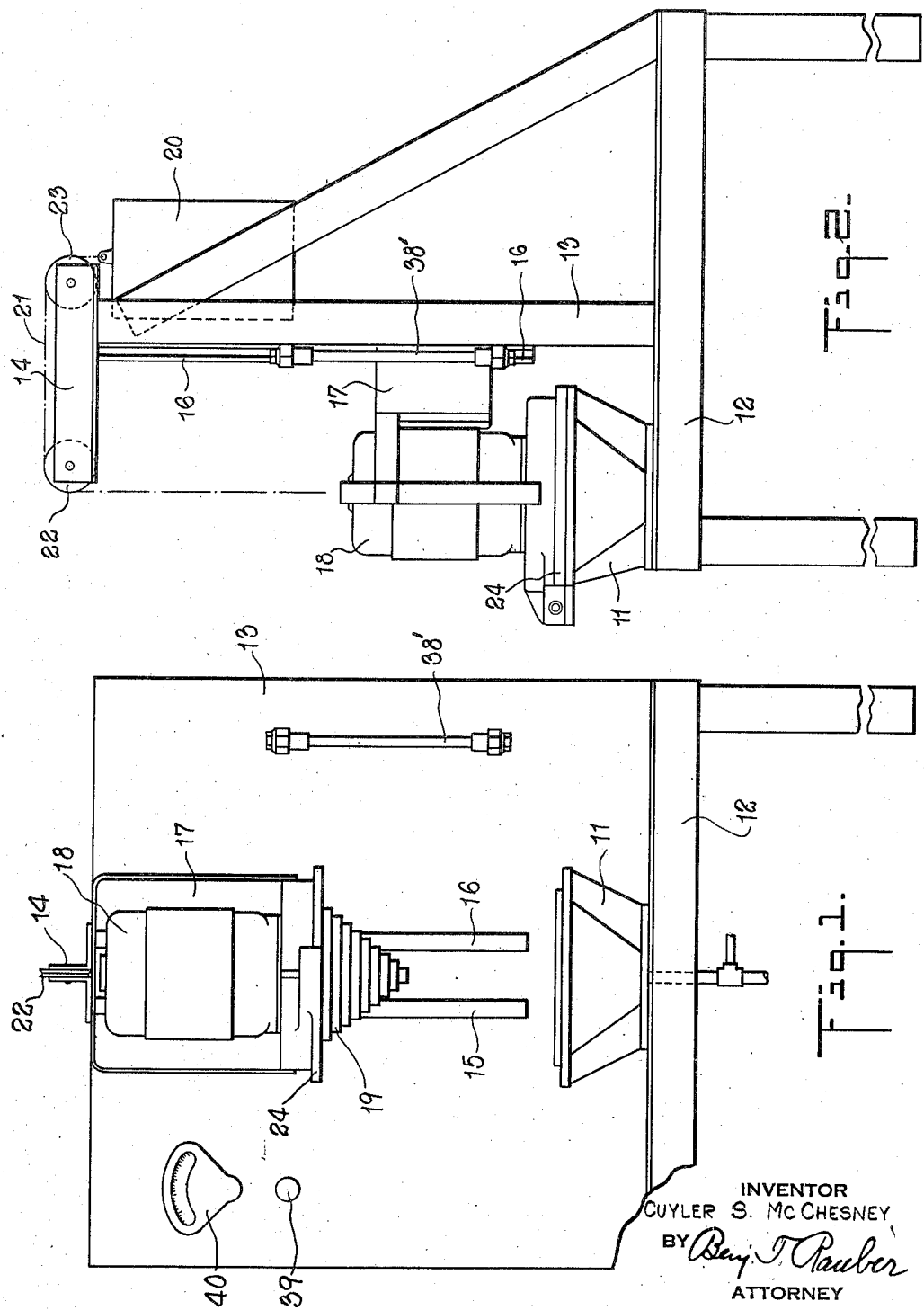

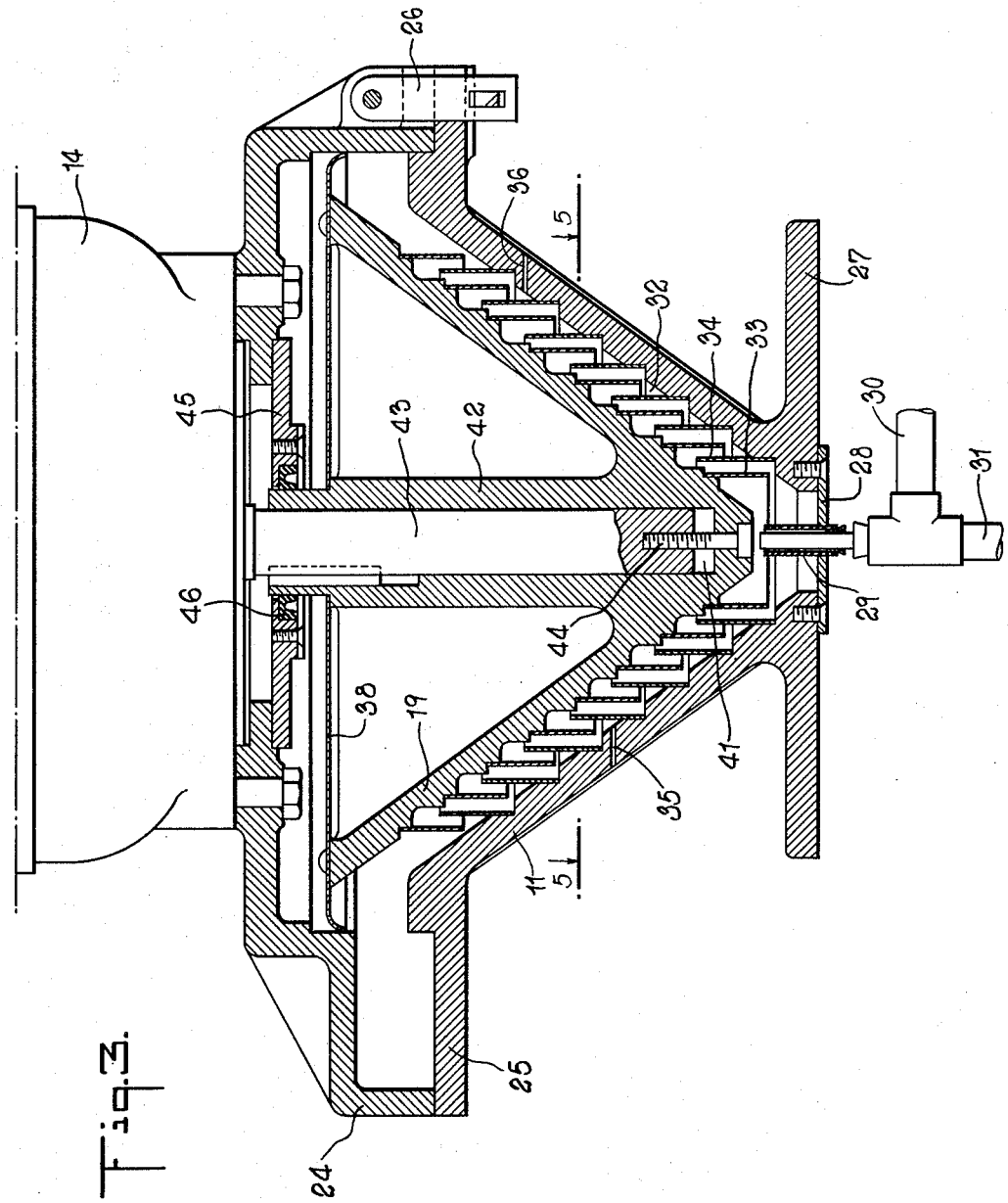

INVENTOR
CUYLER S. McCHESNEY
BY
ATTORNEY

Aug. 18, 1953        C. S. McCHESNEY        2,649,287
APPARATUS FOR CONTINUOUS FROTHING OF RUBBER LATEX
Filed Oct. 11, 1951        4 Sheets-Sheet 4

INVENTOR
CUYLER S. McCHESNEY
BY
ATTORNEY

Patented Aug. 18, 1953

2,649,287

UNITED STATES PATENT OFFICE 2,649,287

APPARATUS FOR CONTINUOUS FROTHING OF RUBBER LATEX

Cuyler S. McChesney, Kenmore, N. Y., assignor to Dunlop Tire and Rubber Corporation, Buffalo, N. Y., a corporation of New York Application October 11, 1951, Serial No. 250,869

10 Claims. (Cl. 259—8)

My present invention relates to apparatus for continuous frothing of liquids, particularly such liquids as rubber latex for the purpose of forming articles or bodies or masses of foamed latex rubber.

In my present invention the latex is foamed to a definite proportion of air and liquid and to a controlled fineness of voids or air spaces in the foam.

The foaming is accomplished rapidly and uniformly and provision is made for the introduction of gelling agents or other ingredients at a selected stage of the foaming.

The various features of my invention are illustrated by way of example in the accompanying drawings in which Fig. 1 is a front elevation of a foaming machine embodying a preferred form of the invention;

Fig. 2 is a side elevation of the machine shown in Fig. 1;

Fig. 3 is a vertical section through the mixing bowl of the invention;

Figure 4:
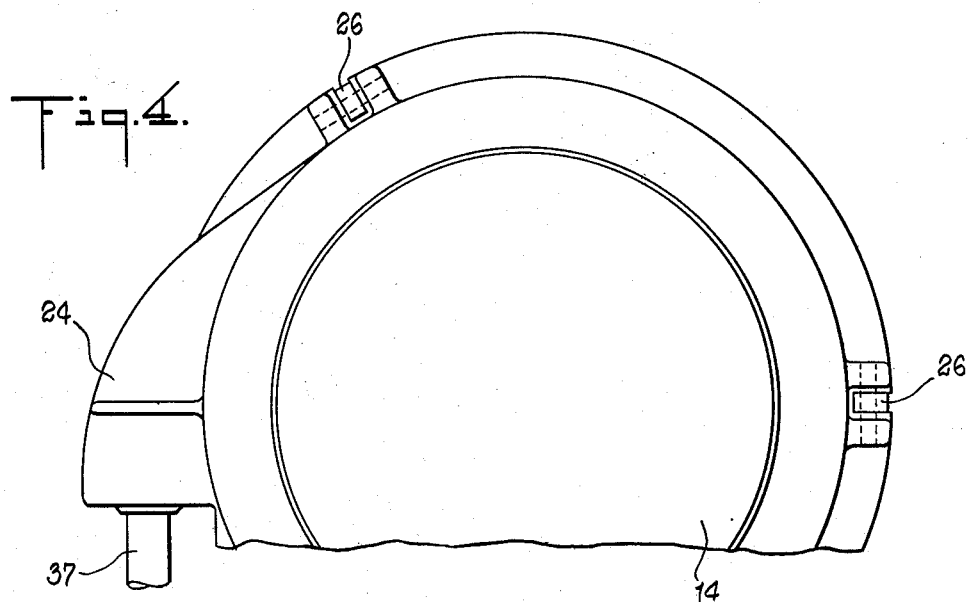
Fig. 4 is a plan view, partly broken away, of the mixing bowl.

In my present invention I provide a stationary bowl or funnel shape fitting to the lower end of which may be introduced measured streams of liquid or air or other gas. This bowl is mounted or fixed on a suitable supporting table or base. Supported above the bowl is a rotor of inverted conical shape driven by a motor. The rotor may be lowered into the bowl to provide an upwardly expanding or flaring passage for the liquid and air or gas introduced at the bottom of the bowl.

The rotor may be rotated at any desired speed. It is provided with a series of spaced rings, preferably co-axial, depending downwardly from the conical surface of the rotor. The bowl is provided with a similar series of up-standing rings in position to alternate with those of the rotor or be interleaved with them and providing narrow spaces between the successive bowl and rotor rings. These rings have passages for the flow of liquid and gas or air. These passages may be slots of any desired shape or openings spaced about the circumference of the rings.

In use measured or proportioned streams of the liquid, such as rubber latex and a gas, such as air, are supplied through a common inlet to the bottom point of the bowl and then pass upwardly through the flaring annular passage between the inner surface of the bowl and the rotor. As the mixture of air and liquid pass upwardly through this passage the air is broken into bubbles by the depending shearing or mixing rings of the rotor and the stationary rings of the bowl. The impact of the rings on the bubbles of air as the liquid and air pass through the openings in the rings shears the bubbles and breaks them to progressively smaller dimensions so that a fine uniform foam of predetermined density leaves the upper edge of the bowl from whence it flows into an off-take or overflow pipe. To aid in throwing the foam into the overflow or off-take pipe, a flinging disc is provided on the upper part of the rotor extending outwardly over the upper edge of the bowl.

Referring more particularly to Figs. 1 and 2, a mixing bowl 11 is shown as mounted on a table or platform 12 having at the rear an upright 13. Suspended from a bracket 14 at the upper end of the upright 13 and supported in guide slots 15 and 16 is a movable bracket 17 carrying a variable speed motor 18 and an inverted conical rotor 19 driven by the motor.

The motor and rotor may be counterbalanced by a weight 20 connected to the bracket 17 by a cord or chain 21 passing over pulleys 22 and 23 in the bracket 14. This manner of supporting the bowl and rotor permits the rotor to be lifted clear or free from the bowl 11 so that both may be inspected, cleaned or repaired. When the bracket 17 is lowered into position, as shown in Fig. 2, a cover plate 24 secured to the lower part of the bracket 17 or motor 18 rests on the upper edge of the bowl.

Figure 5:
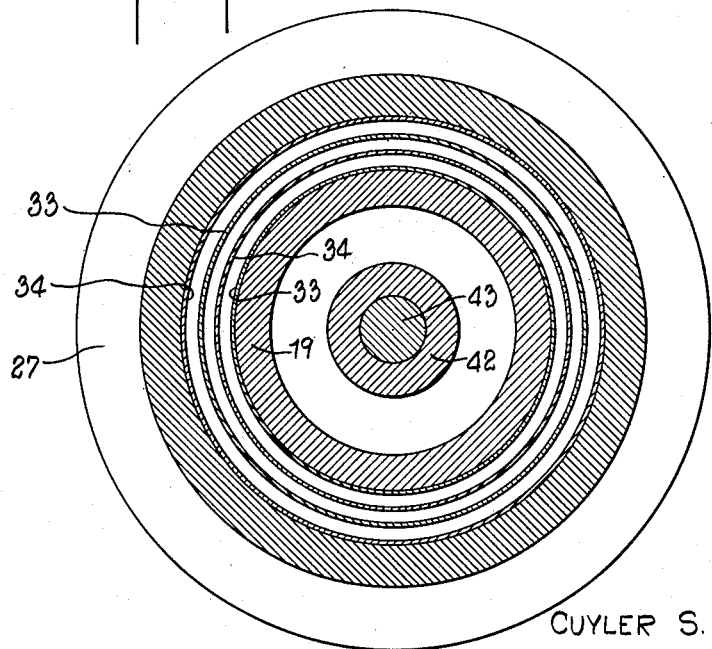
Fig. 5 is a section through the bowl taken on the line 5—5 of Fig. 3.

Referring more particularly to Figs. 3, 4 and 5 the cover 24 is shown as fitting closely or tightly onto a flange 25 on the upper edge of the bowl 11 and being secured thereto by swinging latches 26.

The bowl 11 is of a funnel shape resting at its lower part on a supporting flange 27 and closed by a plate 28. An inlet pipe 29 is provided in the plate 28 through which liquid, such as latex, may be supplied through a pipe 30 and gas, such as air, through a pipe 31. The amounts of air and gas may be proportioned or metered to provide the desired density or proportion of voids to rubber in the foam or cellular article.

As the streams of air and latex are fed into the bottom part of the bowl they pass upwardly through an annular passage 32 of inverted conical shape to the upper edge of the bowl. In passing through the passage 32 the air and latex pass through a ring 33 depending from the lower part of the rotor about the inlet pipe 28. This ring is provided with slots or perforations through which the air and latex flow and is rapidly rotated with the rotor 19, the rapid rotation causes a breaking up of the air and mixing with the latex by impact of the edges of the openings in the ring with the air and liquid. Thereupon the mixture of air or gas and latex pass through openings in a stationary ring 34 mounted in the inclined or tapered wall of the bowl and encircling the rotating ring 33. A succession of pairs of rotating and non-rotating rings similar to rings 33 and 34 are arranged in successive series upwardly in the passage 32 so that the mixture of gas and liquid is impinged repeatedly in its upper passage. This breaks up or shears the bubbles of air into finer bubbles thus very rapidly dividing them into bubbles of minute size and forming a very fine grained foam or froth. At any desired point in the upward travel of the gas and liquid suitable reagents, such as a suspension of zinc oxide, may be introduced through a feed opening 35, or of a gelling agent, such as silicofluoride, through a supply opening 36. As the mixture or froth of liquid and gas reaches the upper edge of the bowl it flows around the edge thereof to an outlet 37 which may be in a general tangential position to the bowl so that the froth or foam, which may be somewhat stiff, will be thrown into this outlet. To confine the froth or foam and aid in its flow to the outlet 37 a flinging disc 38 is mounted at the upper end of the conical rotor 19 at a short distance above the overflow edge of the bowl.

A metered amount of latex is introduced into the bowl by a meter pump, not shown, along with a known amount of air through an air meter, not shown. The amount of air may be measured by an air meter 38', Fig. 1. As the air is broken down into finer bubbles and the volume of the mixture increases the centrifugal force imparted to the mixture by the rotor tends to force the latex upward as it increases in volume. To control this centrifugal force and beating of the foam, the speed of the motor 18 is controlled through a speed control knob 39, Fig. 1, the speed being indicated on a speed indicator 40.

The clearance between the bowl 11 and the rotor 19 may be adjusted to vary the cross-sectional area or space of the passage 32 by means of a spacer 41 of a thickness suitable for the desired spacing inserted at the bottom of a hollow vertical shaft 42 into which the lower end of the motor shaft 43 is received, the rotor being held in place on the motor by means of a screw 44. It will be noted that by using a thinner spacer 41 the rotor may be lifted together with the flinging plate 38, there being sufficient clearance between the rotor and plate and top of the cover 24.

To prevent any of the foam from reaching the motor the top of the cover is closed by a plate 45 having a sealing ring 46 about the hollow shaft 42.

In the form of the invention shown in Fig. 3, rings 33 are of a thin metal secured to the stepped recesses in the lower base of the rotor 19, and the rings 34 are similarly made of thin metal secured to stepped recesses on the inner surface of the bowl 11. It may be noted also that the inlet 29 passes upwardly into the bowl within the circumference of the ring 33 so that the streams of air and liquid are brought into contact with this rotating ring 33.

Figure 6:
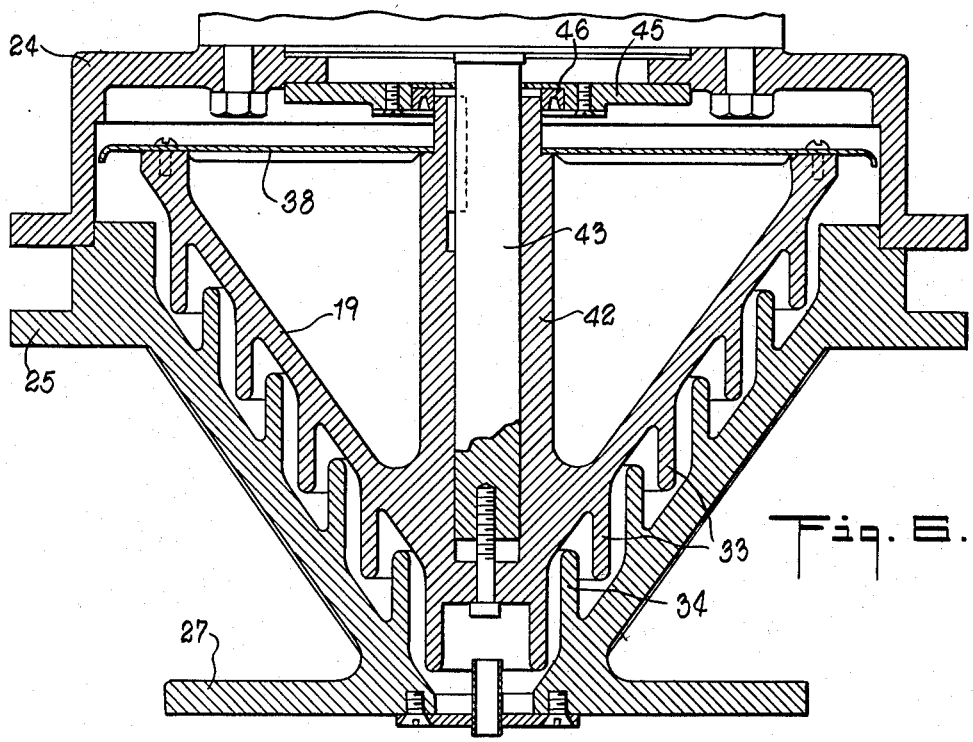
Fig. 6 is a vertical section similar to that of Fig. 3 of a modified form of construction of the mixing bowl.

The construction shown in Fig. 6 is similar to that of Fig. 3 except that the rings 33 are cast integrally on the surface of the rotor 19, while the rings 34 are cast integrally on the inner surface of the bowl 11.

Rings of various types may be employed provided they have passages through which the mixture of air and liquid may pass. Sections of these rings are shown in Figs. 7 to 10 inclusive.

Figure 7:
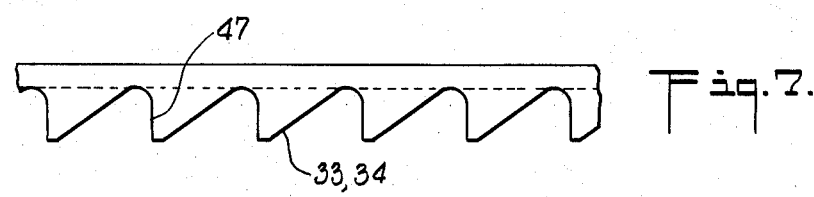
Figs. 7, 8, 9 and 10 are detail views of various forms of whipping or bubble shearing rings for the mixing of the air or gas and the liquid and the shearing of bubbles to smaller dimensions.
Figure 8:
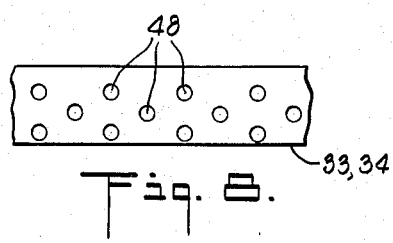
Figure 9:
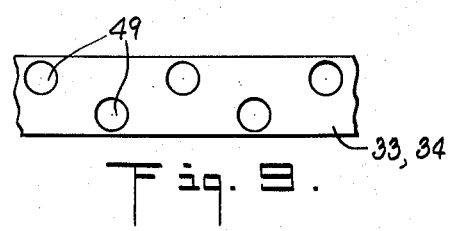
Figure 10:
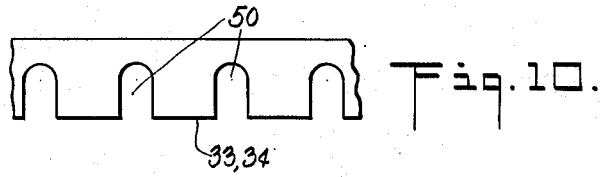

In Fig. 7, for example, the lower edge of the ring is given a serrated form, as shown at 47. In the form in Fig. 8, the rings are provided with a number of holes or perforations 48, there being three rows of holes of moderate size. As shown in Fig. 9, two rows of rings 49 of larger size are used, while in the modification shown in Fig. 10, a series of slots 50 extending upwardly from the free edge of the ring are used. Different types of rings may be used at different places or elevations on the rotor and bowl, as for example, larger holes or openings or slots may be employed in the lower rings, and smaller ones in the upper rings as the size of the bubbles decrease progressively upwardly. In each case the air and liquid is forced to pass through the openings or slots, the mixture will be given centrifugal or whirling motion to cause it to flow upwardly on the inclined walls of the bowl. The centrifugal force will increase with the increase in the radius toward the upper part of the bowl as will also the speed of the rings and their impact on the bubbles of air or gas.

The above invention, therefore, provides a machine in which metered or measured streams of air and liquid, such as latex, may be rapidly and continuously beaten into a uniform foam of desired density and fineness.

Having described my invention, what I claim is:

1. A frothing machine comprising a funnel shaped bowl having an inlet at its lower end and supply pipes to said inlet for a gaseous fluid and a liquid to be frothed therewith, a rotor of inverted conical surface in said bowl and spaced from the inner surface of said bowl to form an inverted conical passage therein, said bowl having cylindrical walls concentric with the axis of said rotor and extending into said inverted conical passage to form concentric annular troughs, the upper ends of said walls being spaced from said rotor, concentric cylindrical walls depending from said rotor into said troughs, said walls being spaced from the cylindrical walls of said bowl and from the bowl to form with said troughs a radially zigzag passage from the inlet to the upper edge of the bowl.

2. The frothing machine of claim 1 having inlet pipes for the admission of streams of material between the lower and upper ends of said passage.

3. The frothing machine of claim 1 in which said inlet extends upwardly into said bowl within the lowermost downwardly extending walls.

4. The frothing machine of claim 1 having a motor with a downwardly extending shaft to which said rotor is secured and means to adjust, said rotor being vertically on said motor shaft.

5. The frothing machine of claim 4 in which said vertical adjusting means comprises spacer plates between said motor shaft and said rotor.

6. The frothing machine of claim 1 in which said cylindrical walls are provided with openings for the passage of liquid and gas.

7. The frothing machine of claim 1 in which said cylindrical walls are provided with slots for the passage of air and liquid.

8. The frothing machine of claim 1 having a horizontal plate extending outwardly from the rotor and in which said bowl is provided with an overflow outlet below said plate.

9. The frothing machine of claim 1 having a supporting upright, a motor guided vertically on said upright, means for counterbalancing said motor, a shaft from said motor extending into and secured to said rotor, a cover for said bowl and a sealing ring in said cover about said shaft.

10. The frothing machine of claim 1 in which said cylindrical walls extending into each of said troughs have passages therethrough.

CUYLER S. McCHESNEY.

References Cited in the file of this patent

UNITED STATES PATENTS

| Number | Name | Date |
|---|---|---|
| 1,600,948 | Poore | Sept. 21, 1926 |
| 1,987,944 | Rafton | Jan. 15, 1935 |
| 2,009,957 | Esch | July 30, 1935 |
| 2,328,950 | Brant | Sept. 7, 1943 |
| 2,498,209 | Iredale | Feb. 21, 1950 |
| 2,541,221 | Edwards | Feb. 13, 1951 |

FOREIGN PATENTS

| Number | Country | Date |
|---|---|---|
| 631,993 | France | Dec. 29, 1917 |